A. S. SPIEGEL.
ROOFING MACHINE.
APPLICATION FILED FEB. 12, 1917.
1,274,623.
Patented Aug. 6, 1918.
2 SHEETS—SHEET 1.
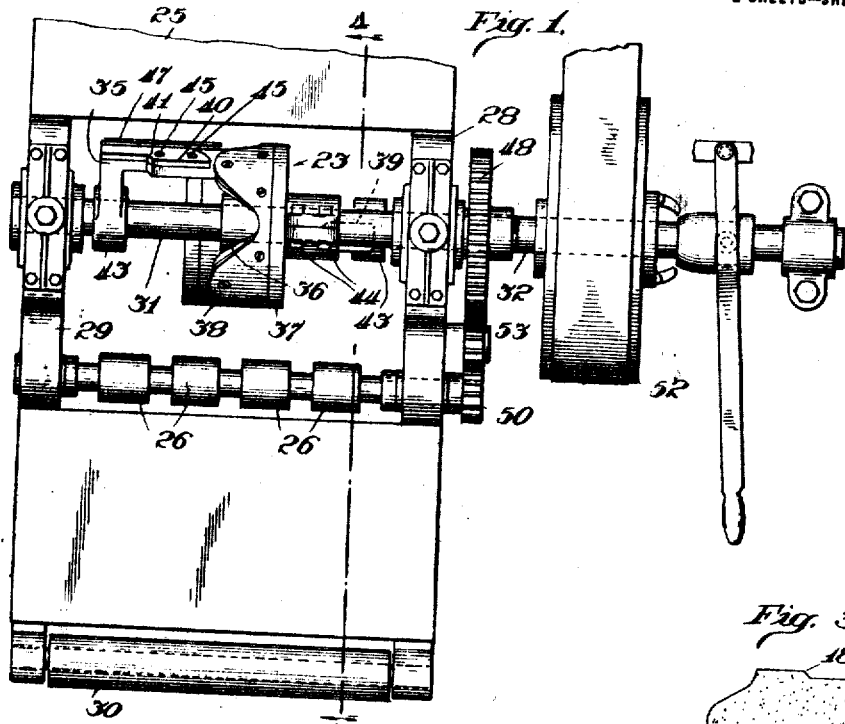
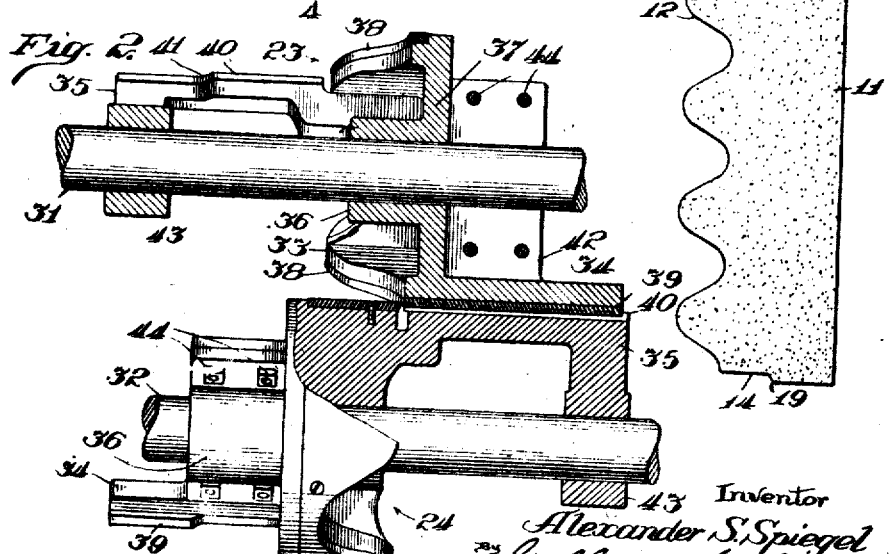
Inventor
Alexander S. Spiegel
by Gillson & Gillson
Attorneys.

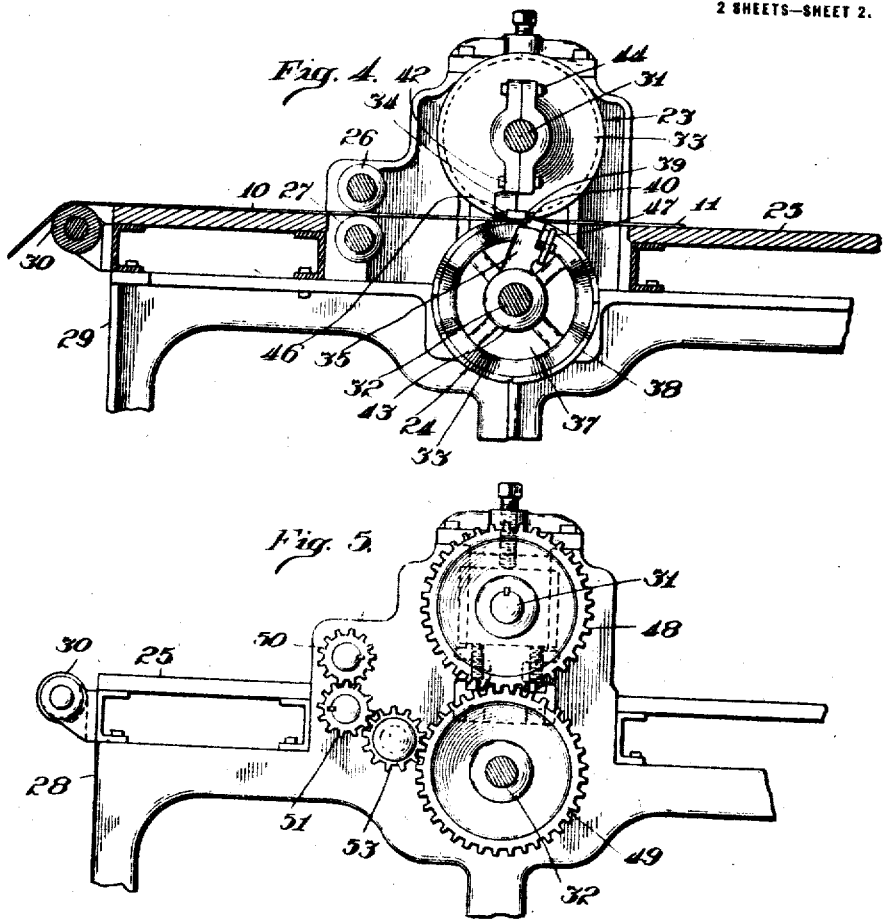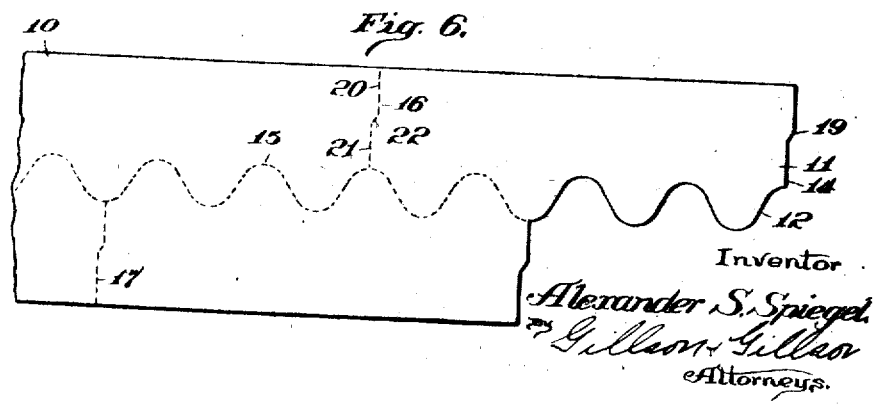

UNITED STATES PATENT OFFICE.

ALEXANDER S. SPIEGEL, OF CHICAGO, ILLINOIS.

ROOFING-MACHINE.

1,274,623.　　　　Specification of Letters Patent.　　Patented Aug. 6, 1918.

Application filed February 12, 1917.　Serial No. 148,111.

*To all whom it may concern:*

Be it known that I, ALEXANDER S. SPIEGEL, a citizen of the United States, and resident of Chicago, county of Cook, and State of Illinois, have invented certain new and useful Improvements in Roofing-Machines, of which the following is a specification, and which are illustrated in the accompanying drawings, forming a part thereof.

The invention relates to machines for making prepared roofing and more particularly to a machine for cutting so-called slab shingles from a continuous web. The object of the invention is to provide a machine which, while being rapid in operation, serves for cutting the shingles accurately to a uniform size and shape and which permits a ready removal of the cutting blades for sharpening or renewal. The invention is exemplified in the machine to be hereinafter described and which is illustrated by the accompanying drawings, wherein—

Figure 1 is a plan view of the improved machine,

Fig. 2 is a detail sectional view taken centrally through the cutting rolls but with some of the parts shown in elevation, Fig. 3 is a plan view showing a form of slab shingle which may be produced by the machine, Fig. 4 is a longitudinal sectional view taken on the plane indicated by the line 4—4 on Fig. 1, but also showing the work in its passage through the machine, Fig. 5 is a detail side view of the machine with the driving pulley omitted and the drive shaft shown in section, and Fig. 6 is a plan view showing a detail of the web of prepared roofing with the cutting operations of the machine indicated thereon by dotted lines.

The particular machine illustrated in the drawing may be used for cutting a continuous web, as 10, of prepared roofing, either into roofing slabs, as 11, (Fig. 3) with a serrated weather edge 12 and interlocking ends 13, 14, or for cutting the said web into continuous roofing strips having the said serrated edge. When the said continuous strips are to be formed the web 10 is merely divided longitudinally upon the sinuous line indicated at 15 (Fig. 6). When the slabs, as 11, are to be formed, additional cuts, as 16 and 17, are made at intervals transversely through the parts of the web 10 at each side of the sinuous line 15. In order that the two ends 13, 14, of each slab 11 may have interlocking shoulders, as 18 and 19, each of the cuts 16, 17 comprises relatively offset end portions 20, 21 and an intermediate oblique connecting portion 22. It will be observed from Fig. 6 that the lateral cutters operate at a projecting point of the sinuous line on one side and at an indented point on the opposite side. Manifestly the longitudinal cut need not be sinuous, but may follow the lines of a truncated cone.

All of the cutting operations of the machine are preferably performed by a pair of coöperating rotary cutting rolls generally designated 23 and 24. As shown, the axes of these rolls are respectively located above and below the plane of a flat table 25 and the web 10 travels continuously over the table for movement between the rolls. The continuous travel of the web is conveniently accomplished by a pair of feed rolls 26 and 27. These feed rolls extend transversely above and below the surface of the table 25 for engagement with the web 10 in advance of its engagement by the cutting rolls 23, 24. A pair of side frames generally designated 28 and 29 provide supports for the table 25. These frames preferably also provide bearings at each side of the table both for the shafts, as 31, 32, upon which the cutting rolls 23 and 24 are mounted and for the feed rolls 26, 27. A guide roll 30 may also be supported between the side frames 28, 29, at one end of the table for engagement with the web 10 as it travels to the table.

The cutting rolls 23 and 24 are preferably of similar but mating construction. As shown, each cutting roll comprises an intermediate cylindrical portion 33 with a lateral extension 34, 35, at each side. A substantial construction is provided by forming the intermediate cylindrical portion 33 with a central hub 36. When so formed, one end of the cylindrical portion 33 is integrally connected with the hub 36 by a web 37. Under these circumstances that end of the cylindrical portion 33 which is remote from the web 37 is formed with a sinuous cutting edge 38. These cutting edges of the two rolls 23, 24 coöperate in shearing relation for longitudinally dividing the web 10 upon the sinuous line 15. On the other hand, the transverse cuts 16 and 17 are formed in the web by mounting coöperating shearing blades 39 and 40 upon the lateral extensions 34 and 35 respectively.

The two sets of blades 39, 40, coöperate in alternation but not at regular intervals. This is for the reason that each end 13, 14, of the slab 11 is alined with an indentation of the serrated edge 12 and this edge of the slab is shown as being formed with an even number of complete serrations. It follows that the lateral extensions 34 and 35 of each cutting roll 23, 24, are not located exactly in diametrically opposite positions with respect to the axis of the corresponding shaft 31 or 32. That is to say, the cutting rolls 23, 24, turn through a less angular distance between the coöperation of the cutting blade 39 of the head 23 with the blade 40 of the head 24 and the coöperation of the blade 39 of the cutting head 24 with the blade 40 of the cutting head 23 than between the coöperation of the last two mentioned blades with those first mentioned. When the slabs 11 are to be formed with interlocking ends 13, 14, as shown, the cutting edge of each blade 39, 40 is offset intermediate its ends, as at 41, (Fig. 1.) The shearing coöperation of the blades 39, 40, accordingly serves to make the cuts 16, 17, upon the broken lines already described.

As the web 10 will usually be provided with a grit or sanded surface, the cutting operations require the application of considerable force and a stout construction is essential. The extensions 34 and 35 of the cutting rolls 23, 24 should accordingly be firmly supported upon the corresponding shaft 31 or 32. Such a support is readily provided for the extension 34 by continuing the hub 36 beyond the web 37 from the cylindrical portion 33 of the corresponding roll and providing this part of the hub 36 with a web 42 which connects with the extension 34. The extension 35, on the other hand, is supported only at its ends. As shown, this extension is formed integral with the corresponding cylindrical portion 33 at one end. Its other end is carried by a separate hub 43, mounted upon the corresponding shaft 31 or 32 at a distance from the hub 36. Each cutting roll 23, 24, is held upon the corresponding shaft 31, 32, by centrally dividing a part of the hub 36 at one side of the web 37 and connecting the two halves of such divided part of the hub about the shaft by clamping bolts, as 44. The web 42 and extension 34 are, however, preferably formed integral with that part of the hub 36 which is also integral with the web 37 and cylindrical portion 33.

The blades 39 and 40 are preferably removably held upon the extension 34 and 35, as by screw bolts 45. These blades are, therefore, easily removed for sharpening and when it is desired to operate the machine for the production of continuous roofing strips it is only necessary to remove one set of these blades. Inasmuch as the cutting blades 39, 40, which are associated with the upper cutting roll 23 are more readily accessible, the blades of this set will usually be removed for the production of the continuous roofing strips. To prevent displacement of the blades 39, 40, it is important that the extensions 34 and 35 should be provided with shoulders for engagement with the rear edges of the blades. As shown, such a shoulder is integrally formed upon the extension 34, as at 46, (Fig. 4). To provide a similar shoulder for the blade 40 a separate piece 47 is bolted against one side of the extension 35.

In order that the cutting rolls 23, 24, may be uniformly driven in opposite directions, the shafts 31 and 32 are geared together, as by intermeshing gears 48 and 49 located at one side of the table 25. The feed rolls 26 and 27 are preferably also geared together, as by intermeshing gears 50 and 51. The parts are driven in any convenient manner as by the application of a belt pulley 52 to the shaft 32. When the gears 50 and 52 are located at the same side of the table 25 with the gears 48 and 49, motion is readily communicated to the feed rolls 26, 27 through an intermediate gear 53 which meshes with the gears 49 and 51.

I claim as my invention—

1. In combination, a pair of coöperating slitting rolls each having a circumferentially continuous cutting edge, and two coöperating sets of rotary transverse cutting blades, the blades of each set being coaxially mounted with one of the slitting rolls and extending laterally in opposite directions from the cutting edge of said roll.

2. In combination, a pair of coöperating slitting rolls each having a circumferentially continuous cutting edge and a pair of coöperating rotary transverse cutting blades each coaxially mounted with one of the slitting rolls and extending laterally from the cutting edge of said roll.

3. In combination, a pair of coöperating slitting rolls having oppositely facing circumferentially continuous sinuous cutting edges, and two sets of coöperating rotary transverse cutting blades, one of the blades of each set being coaxially mounted with one of the slitting rolls and the two blades so associated with each roll being extended laterally in opposite directions from the cutting edge of the said roll, the blade which extends outwardly from the cutting edge of the roll being located at projecting portion of said edge and the blade which extends inwardly from the cutting edge of the roll being located at an indented portion of said edge.

4. In combination, a pair of coöperating slitting rolls 23 and 24, each having a circumferentially continuous cutting edge, lateral extensions on said rolls, shearing blades 39 and 40, on the lateral extensions, the said blades coöperating in alternation but at irregular intervals and arranged so that the rolls 23 and 24 turn through a less angular distance between the coöperation of the cutting blade of the roll 23 with the blade 40 of the roll 24 and the coöperation of the blade 39 of the roll 24 with the blade 40 of roll 23 than between the coöperation of the last mentioned blades with those first mentioned.

5. In combination, a pair of coöperating slitting rolls having oppositely facing circumferentially continuous cutting edges adapted to form a cut in roofing presenting a series of projections and indentations, and two sets of coöperating rotary transverse cutting blades, one of the blades of each set being coaxially mounted with one of the slitting rolls and the two blades so associated with each roll being extended laterally in opposite directions from the cutting edge of said roll, the blade which extends outwardly from the cutting edge of the roll being located at a projecting portion of said edge and the blade which extends inwardly from the cutting edge of the roll being located at an indented portion of said edge.

ALEXANDER S. SPIEGEL.